United States Patent
Zhong et al.

(10) Patent No.: US 11,080,928 B2
(45) Date of Patent: Aug. 3, 2021

(54) METHODS AND APPARATUS FOR VISIBILITY STREAM MANAGEMENT

(71) Applicant: QUALCOMM Incorporated, San Diego, CA (US)

(72) Inventors: Gang Zhong, San Diego, CA (US); Li Shen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/372,149

(22) Filed: Apr. 1, 2019

(65) Prior Publication Data
US 2020/0312020 A1    Oct. 1, 2020

(51) Int. Cl.
*G06T 15/00* (2011.01)
*G06T 17/10* (2006.01)
*G06T 17/20* (2006.01)

(52) U.S. Cl.
CPC ............ *G06T 17/10* (2013.01); *G06T 15/005* (2013.01); *G06T 17/20* (2013.01)

(58) Field of Classification Search
None
See application file for complete search history.

(56) References Cited

U.S. PATENT DOCUMENTS

| | | | | |
|---|---|---|---|---|
| 7,170,515 B1* | 1/2007 | Zhu | ....................... | G06T 15/005 345/422 |
| 2010/0231588 A1* | 9/2010 | Barczak | ................ | G06T 15/405 345/422 |
| 2013/0120380 A1* | 5/2013 | Kallio | ................... | G06T 15/005 345/421 |
| 2013/0265309 A1* | 10/2013 | Goel | ....................... | G06T 15/00 345/426 |
| 2014/0198119 A1* | 7/2014 | Seetharamaiah | ..... | G06T 15/005 345/581 |
| 2014/0354661 A1* | 12/2014 | Balci | ........................ | G06T 1/20 345/522 |
| 2016/0125649 A1* | 5/2016 | Jeong | .................... | G06T 15/405 345/422 |
| 2016/0148424 A1* | 5/2016 | Chung | ................. | G06T 15/005 345/423 |

(Continued)

*Primary Examiner* — Anh-Tuan V Nguyen
(74) *Attorney, Agent, or Firm* — Campbell C. Chiang; Arent Fox LLP

(57) ABSTRACT

The present disclosure relates to methods and apparatus for graphics processing. In some aspects, the apparatus can determine a plurality of sub-primitives corresponding to one or more primitives in an image. The apparatus can also determine visibility information for each of the sub-primitives. The visibility information can include information regarding whether the sub-primitive is visible. Further, the apparatus can identify one or more of the sub-primitives as visible based on the visibility information. The apparatus can also determine a sub-primitive visibility stream including the sub-primitives identified as visible. Additionally, the apparatus can render at least one of the sub-primitives identified as visible in the sub-primitive visibility stream. The apparatus can also identify at least one of the sub-primitives as not visible based on the determined visibility information. Moreover, the apparatus can determine to skip rendering the at least one of the sub-primitives identified as not visible.

23 Claims, 7 Drawing Sheets

(56) References Cited

U.S. PATENT DOCUMENTS

| | | | |
|---|---|---|---|
| 2016/0148426 A1* | 5/2016 | Son | G06T 15/005 |
| | | | 345/423 |
| 2016/0364901 A1* | 12/2016 | Balci | G06T 15/06 |
| 2017/0140573 A1* | 5/2017 | Woo | G06T 15/005 |
| 2017/0263039 A1* | 9/2017 | Goel | G06T 15/00 |
| 2017/0352182 A1* | 12/2017 | Wang | G06T 15/405 |
| 2018/0189923 A1* | 7/2018 | Zhong | G06T 15/005 |
| 2018/0189925 A1* | 7/2018 | Lee | G06T 7/50 |
| 2018/0190021 A1* | 7/2018 | Bhiravabhatla | G06T 15/40 |
| 2018/0286112 A1* | 10/2018 | Lauritzen | G06T 17/20 |
| 2020/0098078 A1* | 3/2020 | Bujewski | G06T 1/20 |

* cited by examiner

METHODS AND APPARATUS FOR VISIBILITY STREAM MANAGEMENT

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU). In some aspects, the apparatus can determine a plurality of sub-primitives corresponding to one or more primitives in an image. The apparatus can also determine visibility information for each of the plurality of sub-primitives. The visibility information can include information regarding whether the sub-primitive is visible. Further, the apparatus can identify one or more of the plurality of sub-primitives as visible based on the determined visibility information. The apparatus can also determine a sub-primitive visibility stream including the one or more of the plurality of sub-primitives identified as visible. Additionally, the apparatus can render at least one of the one or more of the plurality of sub-primitives identified as visible in the sub-primitive visibility stream. The apparatus can also identify at least one of the plurality of sub-primitives as not visible based on the determined visibility information. Moreover, the apparatus can determine to skip rendering the at least one of the plurality of sub-primitives identified as not visible.

In some aspects, when determining the plurality of sub-primitives the apparatus can be further configured to generate the plurality of sub-primitives in a tessellator. Also, when determining the sub-primitive visibility stream the apparatus can be further configured to generate the sub-primitive visibility stream including the one or more of the plurality of sub-primitives identified as visible. The apparatus can also generate graphical content based on the sub-primitive visibility stream. In some aspects, the apparatus can determine primitive visibility information for the one or more primitives, where the primitive visibility information can include information regarding whether the one or more primitives are at least partially visible. The apparatus can also identify the one or more primitives as visible. The apparatus can also generate a primitive visibility stream including the one or more primitives. In some aspects, the apparatus can also determine draw call visibility information for one or more draw calls, where the draw call visibility information can include information regarding whether the one or more draw calls are at least partially visible. The apparatus can also identify the one or more draw calls as visible. Further, the apparatus can generate a draw call visibility stream including the one or more draw calls.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
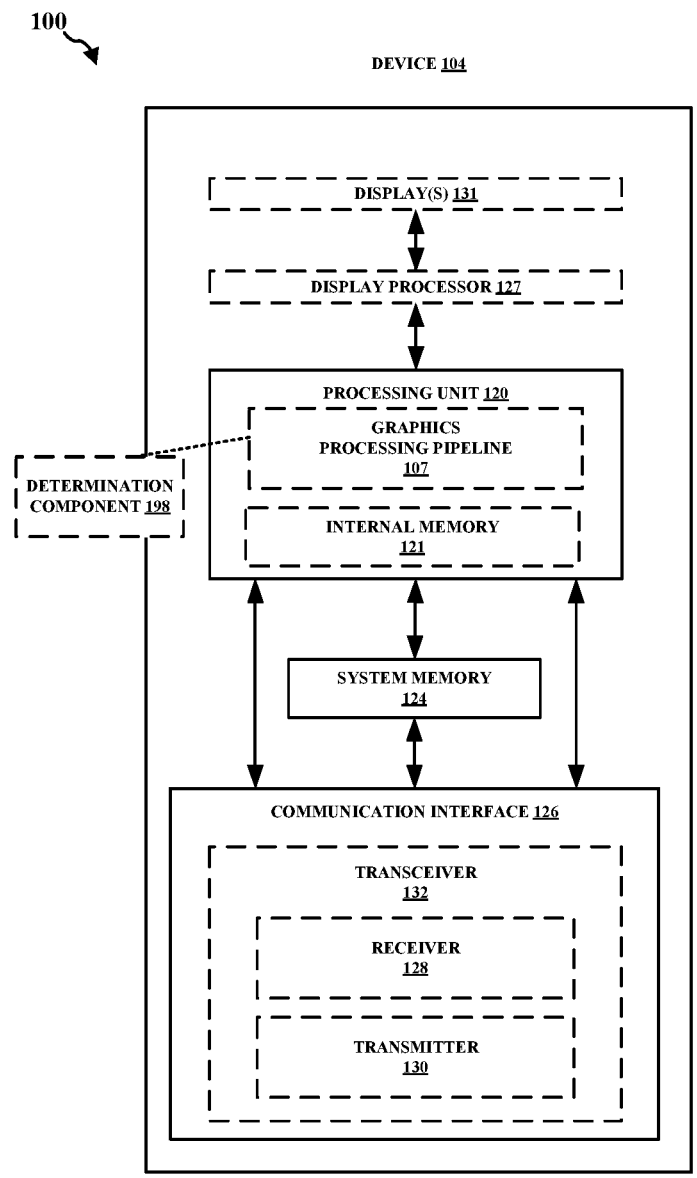
FIG. 1 is a block diagram that illustrates an example content generation system in accordance with one or more techniques of this disclosure.

Aspects of the present disclosure can introduce detailed visibility information, such as by using the visibility information of sub-primitives or tessellated primitives. For instance, if the detailed visibility information is utilized, e.g., by using the sub-primitives or tessellated primitives, then GPUs herein can identify which sub-primitives are visible or not visible. By doing so, aspects of the present disclosure can determine or generate a visibility stream for sub-primitives, i.e., a sub-primitive visibility stream. Accordingly, during the rendering process, GPUs herein may render the sub-primitives that are visible. For example, GPUs herein can skip rending the sub-primitives that are not visible. As such, aspects of the present disclosure can save or conserve rendering or processing resources by rendering or processing the sub-primitives or tessellated primitives that are visible.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

As used herein, instances of the term "content" may refer to graphical content or display content. In some examples, as used herein, the term "graphical content" may refer to a content generated by a processing unit configured to perform graphics processing. For example, the term "graphical content" may refer to content generated by one or more processes of a graphics processing pipeline. In some examples, as used herein, the term "graphical content" may refer to content generated by a graphics processing unit. In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more of its components configured to perform one or more techniques of this disclosure. In the example shown, the device 104 may include a processing unit 120, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120, such as system memory 124, may be accessible to the processing unit 120. For example, the processing unit 120 may be configured to read from and/or write to external memory, such as the system memory 124. The processing unit 120 may be communicatively coupled to the system memory 124 over a bus. In some examples, the processing unit 120 may be communicatively coupled to each other over the bus or a different connection.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to determine a plurality of sub-primitives corresponding to one or more primitives in an image. The determination component 198 can also be configured to determine visibility information for each of the plurality of sub-primitives. The visibility information can include information regarding whether the sub-primitive is visible. Further, determination component 198 can be configured to identify one or more of the plurality of sub-primitives as visible based on the determined visibility information. The determination component 198 can also be configured to determine a sub-primitive visibility stream including the one or more of the plurality of sub-primitives identified as visible. Additionally, the determination component 198 can be configured to render at least one of the one or more of the plurality of sub-primitives identified as visible in the sub-primitive visibility stream. The determination component 198 can also be configured to identify at least one of the plurality of sub-primitives as not visible based on the determined visibility information. Moreover, the determination component 198 can be configured to determine to skip rendering the at least one of the plurality of sub-primitives identified as not visible.

In some aspects, when determining the plurality of sub-primitives the determination component 198 can also be configured to generate the plurality of sub-primitives in a tessellator. Also, when determining the sub-primitive visibility stream the determination component 198 can also be configured to generate the sub-primitive visibility stream including the one or more of the plurality of sub-primitives identified as visible. The determination component 198 can also be configured to generate graphical content based on the sub-primitive visibility stream. In some aspects, the determination component 198 can be configured to determine primitive visibility information for the one or more primitives, where the primitive visibility information can include information regarding whether the one or more primitives are at least partially visible. The determination component 198 can also be configured to identify the one or more primitives as visible. The determination component 198 can also be configured to generate a primitive visibility stream including the one or more primitives. In some aspects, the determination component 198 can be configured to determine draw call visibility information for one or more draw calls, where the draw call visibility information can include information regarding whether the one or more draw calls are at least partially visible. The determination component 198 can also be configured to identify the one or more draw calls as visible. Further, the determination component 198 can be configured to generate a draw call visibility stream including the one or more draw calls.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein.

Figure 2:
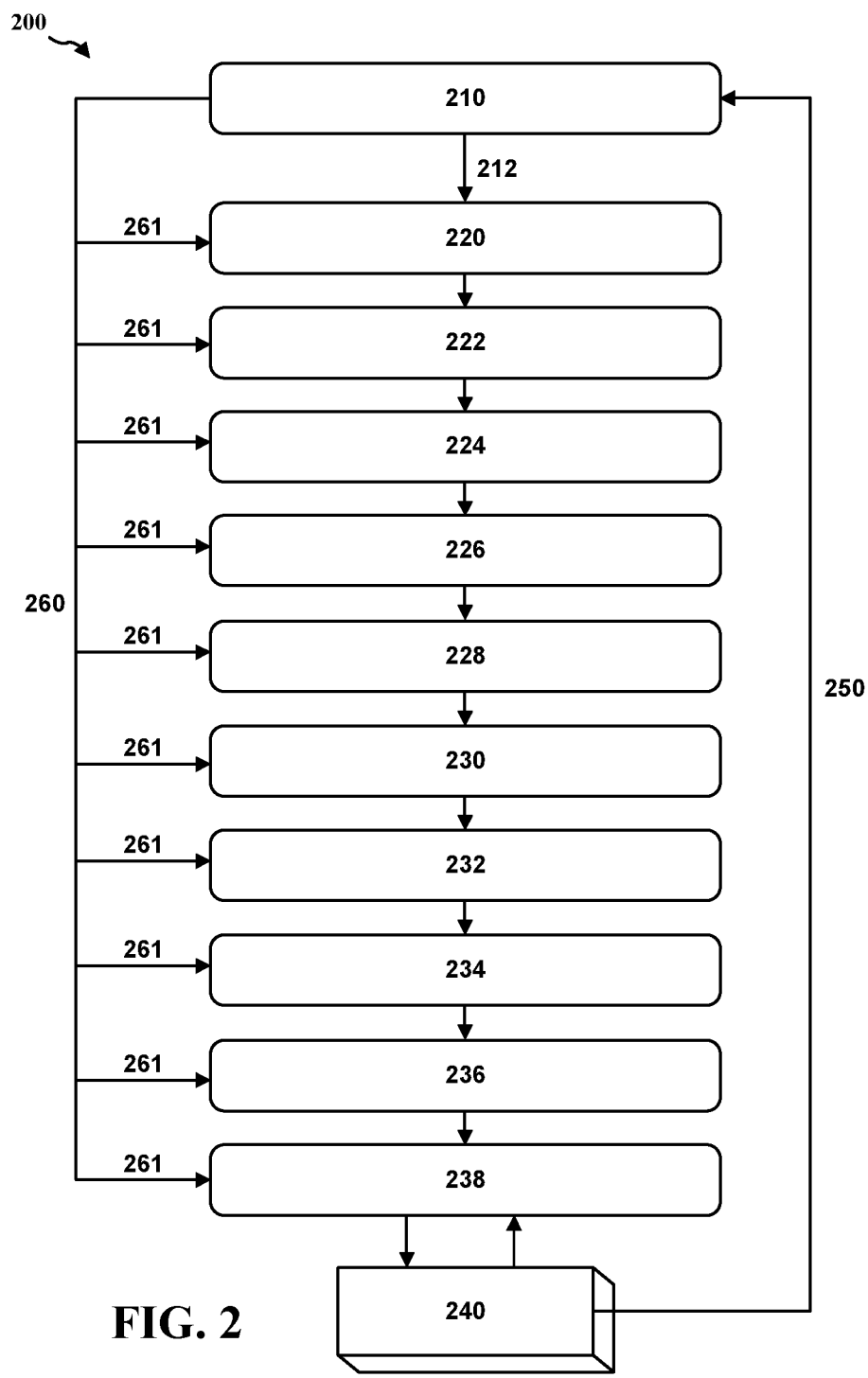
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, vertex fetcher (VFD) 220, vertex shader (VS) 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

GPUs can process multiple types of data in a GPU pipeline. For instance, in some aspects, a GPU can process two types of data or data packets, e.g., context register packets and draw call data. As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured as follows: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. Moreover, in the binning pass, different primitives can be shaded in certain bins, e.g., using draw calls. In some aspects, during the binning pass, a visibility stream can be constructed where visible draw calls can be identified.

In some aspects, GPUs can apply the drawing or rendering process to different bins or tiles. For instance, a GPU can render to one bin, and then perform all the draws for the primitives or pixels in the bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry.

As mentioned above, in some aspects, a draw call visibility stream can be generated to determine the visibility information of each draw call in an image or scene. This draw call visibility stream can identify whether a draw call is visible or not. Additionally, a primitive visibility stream can be generated, e.g., in a binning pass, to determine the visibility information of each primitive in an image or scene. For instance, this primitive visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects, GPUs can perform a tessellation or tessellation process. During a tessellation process, larger primitives can be divided into smaller sub-primitives or tessellated primitives. Tessellation can divide an image into more detailed sub-primitives or tessellated primitives, which can lead to a more detailed rendering process and more detailed graphical content. A tessellator can determine or generate the sub-primitives or tessellated primitives. In some aspects, one or more primitives can be grouped into a patch. A tessellator can then determine or generate a geometry-based tessellation of the patch, e.g., using triangles or rectangles, according to one or more tessellation parameters.

The tessellation process can allow for determining or generating a more detailed or smoother image or surface than would otherwise be generated based on the original patch of primitives. Additionally, tessellation can be used for implementing or rendering more detailed surfaces in an image. As mentioned above, the tessellation process can produce sub-primitives or tessellated primitives. These sub-primitives or tessellated primitives are generated as an output from the tessellation, e.g., based on one or more primitives or patches. These primitives can also be referred to as original or regular primitives, which are generated based on the original image or surface value. The determined or generated sub-primitives or tessellated primitives can be a more detailed version of the original primitive or patch. In some instances, each of the sub-primitives can be smaller than each of the primitives or patch. Accordingly, the original primitives may appear to be divided into the sub-primitives or tessellated primitives.

Figure 3:
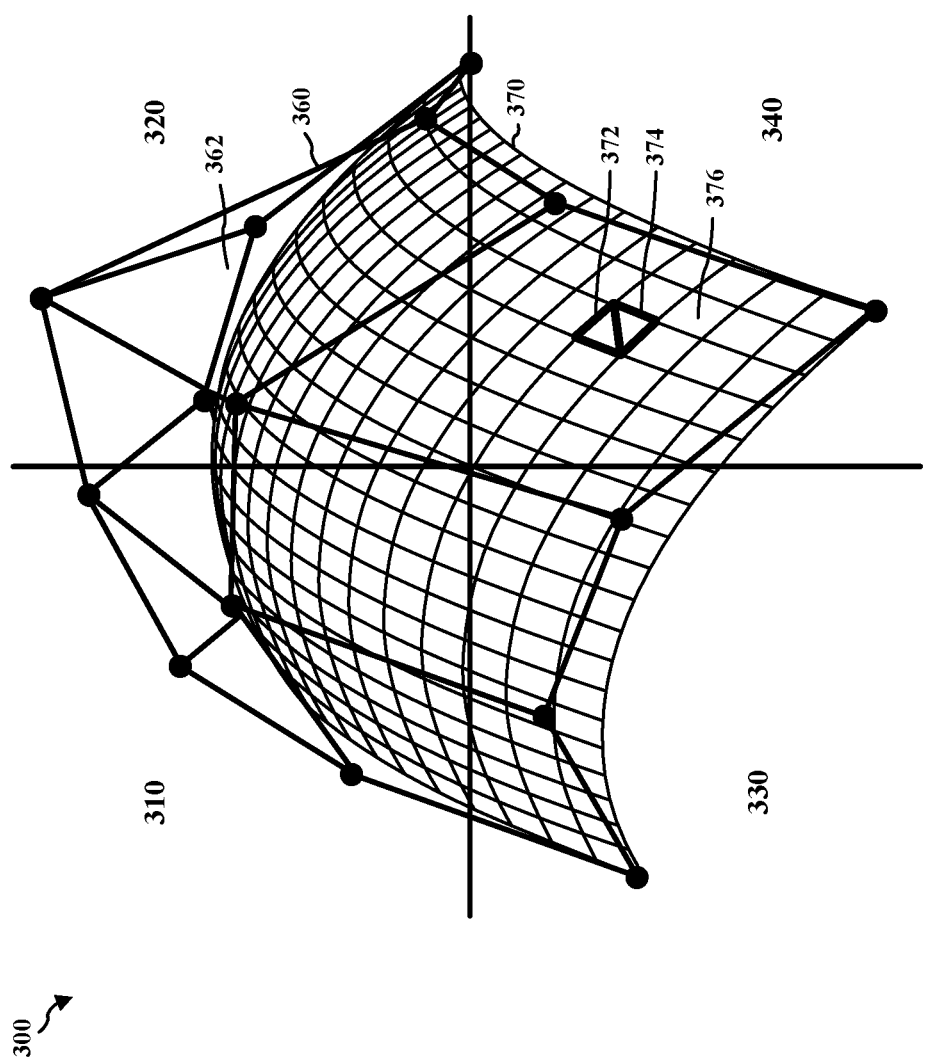
FIG. 3 illustrates an example image or surface in accordance with one or more techniques of this disclosure.

FIG. 3 illustrates an example image or surface 300 in accordance with one or more techniques of this disclosure. FIG. 3 illustrates that the image 300 is divided into multiple bins, e.g., bin 310, bin 320, bin 330, and bin 340. Also, FIG. 3 displays patch 360 which includes one or more primitives 362. In some aspects, patch 360 can be referred to as a group of primitives or one or more primitives. FIG. 3 also displays a plurality of sub-primitives 370 which includes sub-primitive 372, sub-primitive 374, and sub-primitive 376. As shown in FIG. 3, the individual sub-primitives in the plurality of sub-primitives 370 can be a number of different shapes such as rectangles, e.g., sub-primitive 376, or triangles, e.g., sub-primitives 372, 374.

FIG. 3 displays an example of the aforementioned tessellation process. For example, the original or input primitives, e.g., one or more primitives 362 in patch 360, are displayed as the larger triangles with the dots as vertices. The sub-primitives or tessellated primitives, e.g., sub-primitives 370, that are output from the tessellation process are displayed as the smaller rectangles or triangles on the surface 300, e.g., sub-primitives 372, 374, 376.

In some aspects, by not utilizing the tessellation process, the larger primitives, e.g., one or more primitives 362 in patch 360, may have visibility information generated. So without tessellation, a visibility stream may be determined or generated for the larger primitives or patch, e.g., one or more primitives 362 in patch 360. Also, in some aspects, when not using tessellation, if at least a portion of a larger primitive on the surface is determined to be visible, then all the triangles in the patch may be identified or marked as visible. Accordingly, if a portion of a triangle is visible, then the visibility calculation for the surface may not be accurate. This can result is unnecessarily rendering or processing primitives or sub-primitives that are not visible.

As indicated above, a primitive visibility stream can identify whether a certain primitive is visible or not. When utilizing a tessellation process, it can be inefficient to associate the visibility information for the larger primitives in the primitive visibility stream with the sub-primitives, e.g., generated by the tessellator. For instance, the visibility information for the larger primitives may be too coarse or large to identify the visibility information for the sub-primitives or tessellated primitives. This can occur because the tessellation process generates smaller, more detailed sub-primitives compared to the larger primitives. In some aspects, a tessellator may not be able to determine or distinguish visibility information based on the primitives, as the primitive visibility information can be too coarse or large to be useful for tessellated primitives.

As mentioned herein, a primitive visibility stream can be generated based on an original primitive or patch of primitives. In some aspects, the sub-primitives or tessellated primitives can inherit or be associated with the visibility information from the primitive visibility stream. As indicated above, this visibility information can be inaccurate when associated with sub-primitives or tessellated primitives, as the visibility information is too large or coarse to accurately identify visibility information for the smaller sub-primitives. In some aspects, using this primitive visibility information with the sub-primitives can result in sub-primitives that are not visible being rendered. For example, sub-primitives may be sent down the GPU pipeline, e.g., to a domain shader (DS), for each bin that the original patch or primitive touches. This can result in sub-primitives being unnecessarily rendered when they are not visible. Accordingly, this can waste rendering or processing resources and the overall throughput of the GPU.

Aspects of the present disclosure can introduce detailed visibility information, such as by using the visibility information of sub-primitives or tessellated primitives. For instance, if the detailed visibility information is utilized, e.g., by using the sub-primitives or tessellated primitives, then GPUs herein can identify which sub-primitives are visible or not visible. By doing so, aspects of the present disclosure can determine or generate a visibility stream for sub-primitives, i.e., a sub-primitive visibility stream. Accordingly, during the rendering process, GPUs herein may render the sub-primitives that are visible. For example, GPUs herein can skip rendering the sub-primitives that are not visible. As such, aspects of the present disclosure can save or conserve rendering or processing resources by rendering or processing the sub-primitives or tessellated primitives that are visible.

Aspects of the present disclosure can introduce an extra hierarchical level of visibility stream, e.g., a sub-primitive visibility stream, which can indicate the visibility information of sub-primitives or tessellated primitives that are determined or generated during a tessellation process, e.g., by a tessellator. For example, a sub-primitive visibility stream or tessellated visibility stream can be included in a visibility stream hierarchy along with a draw call visibility stream and a primitive visibility stream. As mentioned above, a draw call visibility stream can provide visibility information for one or more draw calls and a primitive visibility stream can provide visibility information for one or more primitives or original primitives. The sub-primitive visibility stream or tessellated visibility stream of the present disclosure can provide another level of more detailed visibility information, e.g., by determining or generating visibility information for sub-primitives or tessellated primitives.

In some aspects of the present disclosure, for each sub-primitive or tessellated primitive generated by the tessellation, GPUs herein can determine or store the visibility information for the sub-primitive or tessellated primitive. For instance, this visibility information can be used in one or more data passes, e.g., a second of two data passes, to render sub-primitives based on whether or not they are visible. For example, aspects of the present disclosure can render sub-primitives that are visible and/or skip rendering sub-primitives that are not visible. As mentioned above, aspects of the present disclosure can add another lever to a visibility stream hierarchical structure, e.g., for sub-primitive or tessellated primitive visibility information. This sub-primitive visibility stream can be a level below the primitive visibility stream and/or the draw call visibility stream.

With this extra level of visibility stream hierarchy, aspects of the present disclosure can skip or remove the tessellated primitives that are not visible to reduce the workload of the GPU. Accordingly, aspects of the present disclosure can include a new visibility stream for primitives generated by the tessellation process, e.g., sub-primitives. GPUs herein can utilize this new visibility stream in the rendering pass to skip or drop invisible tessellated primitives. By doing so, aspects of the present disclosure can significantly reduce the amount of vertices and/or primitives that are rendered or processed by the GPU. For example, there can be significant reduction in the percentage of vertices processed, e.g., a 49% reduction, and a significant reduction in the percentage of primitives processed, e.g., a 64% reduction. In turn, this can results in a significant reduction in the rendering or processing workload by the GPU.

In some aspects, GPUs herein can enhance an existing visibility stream compressor, e.g., to generate the tessellated primitive visibility stream with a new compression format that is suitable for tessellated primitives. Additionally, aspects of the present disclosure can include a new decoder or decompressor, e.g., a tessellated primitive visibility stream decoder (TessVSD), that can decode the tessellated primitive visibility stream. For instance, the TessVSD can skip or drop the sub-primitives that are not visible, e.g., based on a per-bin visibility mask. The TessVSD can also decode and/or feed the visibility information of the tessellated primitives for visible patches to a tessellator. In turn, the tessellator may use this information to skip or drop tessellated primitives that are not visible. By doing so, visible tessellated primitives may be processed or sent further down the GPU pipeline.

In some aspects, the tessellated primitive visibility stream can add another level, e.g., a third level out of three levels, to a hierarchical visibility stream to increase the granularity or level of detail in the visibility stream. As mentioned above, the hierarchical visibility stream can include a draw call visibility stream, a primitive visibility stream, and a sub-primitive visibility stream. In some instances, the order of the visibility stream hierarchy in increasing granularity can be: 1) draw call visibility stream, 2) primitive visibility stream, and 3) sub-primitive visibility stream. As such, aspects of the present disclosure can add another level of visibility stream for increased detail or granularity.

In some aspects, the tessellated primitive visibility stream can include aspects of encoding and decoding. For instance, the tessellated primitive visibility stream can encode an end of tessellated primitive (EOT) identification that denotes or identifies the last tessellated primitive in the visibility stream. The tessellated primitive visibility stream can also encode which tessellated primitive is visible, e.g., to accumulate the visibility of all the tessellated primitives. Additionally, the tessellated primitive visibility stream can decode using a TessVSD or third visibility stream decoder. The TessVSD can be independent from other visibility stream decoders, e.g., a draw call visibility stream decoder (D-VSD) or primitive visibility stream decoder (P-VSD). The TessVSD can also synchronize the tessellated primitives, e.g., in a visible patch of primitives, with the decoded visibility stream. Further, the TessVSD can enable GPUs herein to include new decoding tokens or code to contrast with the draw call visibility stream or primitive visibility stream, in addition to generating the visibility stream for tessellated primitives.

In some instances, when aspects of the present disclosure decode the sub-primitives, GPUs herein can also determine an end-of-patch (EOP) as a boundary for the tessellated visibility stream. This EOP can identify the last tessellated primitive in the tessellated visibility stream. The decoder or TessVSD can determine or identify the sub-primitive information to determine if the original primitive should be skipped or dropped or should be synchronized with the tessellator output. In some aspects, the decoder or TessVSD may depend on the primitive visibility stream, e.g., it can depend on the primitive controller draw call passer (PC_DP) block. Further, the output of the sub-primitive visibility stream can be placed into a first-in-first-out (FIFO) queue, e.g., to wait for the tessellator output to perform a synchronization. In other aspects, the TessVSD can be placed in the PC_DP block.

In some aspects, the aforementioned encoding and decoding can correspond to a tiled-rendering framework, such that the present disclosure can include two passes to render an image or scene. For example, the first pass can be to generate the levels of visibility streams, e.g., the draw call, primitive, and sub-primitive visibility streams. Once the visibility information is determined, aspects of the present disclosure can perform the rendering pass or second pass. During the rendering pass, aspects of the present disclosure can perform the primitive or sub-primitive shading, as well as calculate the primitive shader execution. As mentioned above, based on the sub-primitive visibility stream, aspects of the present disclosure can render the visible sub-primitives and skip the sub-primitives that are not visible, which can conserve or save GPU rendering resources. Accordingly, rather than shading an entire primitive when a portion of the primitive is visible, aspects of the present disclosure can shade a portion of the primitive, e.g., one or more sub-primitives. By doing so, GPUs herein can conserve or save rendering resources, bandwidth, and/or power.

As mentioned above, aspects of the present disclosure can utilize three levels of visibility stream hierarchy. In some aspects, if a portion of a draw call is visible, aspects of the present disclosure can fetch the corresponding primitive visibility stream. If a draw call is not visible, GPUs herein may not fetch the corresponding primitive visibility stream, as the draw call may be skipped or not rendered. Also, for a primitive visibility stream, aspects of the present disclosure can decode each individual primitive, and determine the visibility of the primitive using a patch of one or more primitives. In some aspects, the patches that are at least partially visible can be sent to a tessellator. In turn, the tessellator can perform the tessellation process and generate an output of sub-primitives. In some instances, the tessellator output can synchronize the output of the primitives with the tessellated primitive visibility stream. Accordingly, the tessellated primitives may be processed or rendered for visible primitives. For instance, as the visible patches may be sent to the tessellator, the sub-primitives or tessellated primitives can be processed based on the visible primitives.

As mentioned above, without using a sub-primitive or tessellated primitive visibility stream, GPUs may have the visibility information for an entire patch of primitives, so the entire patch is rendered if any of the sub-primitives are visible. By adding a sub-primitive visibility stream to identify which of the sub-primitives are visible, aspects of the present disclosure can add a higher level of visibility detail, which can help to reduce the amount of primitives or sub-primitives that are unnecessarily rendered. For example, if some of the sub-primitives are visible, then GPUs herein can process the visibility information for the sub-primitives by generating the sub-primitive visibility stream, e.g., so that we can identify the more detailed sub-primitive visibility information. This sub-primitive visibility stream can be useful when the patch of primitives is partially visible, such that some of the sub-primitives are visible and some are not. Further, if none of the sub-primitives in a patch are visible, the sub-primitive visibility stream may not be generated.

Figure 4:
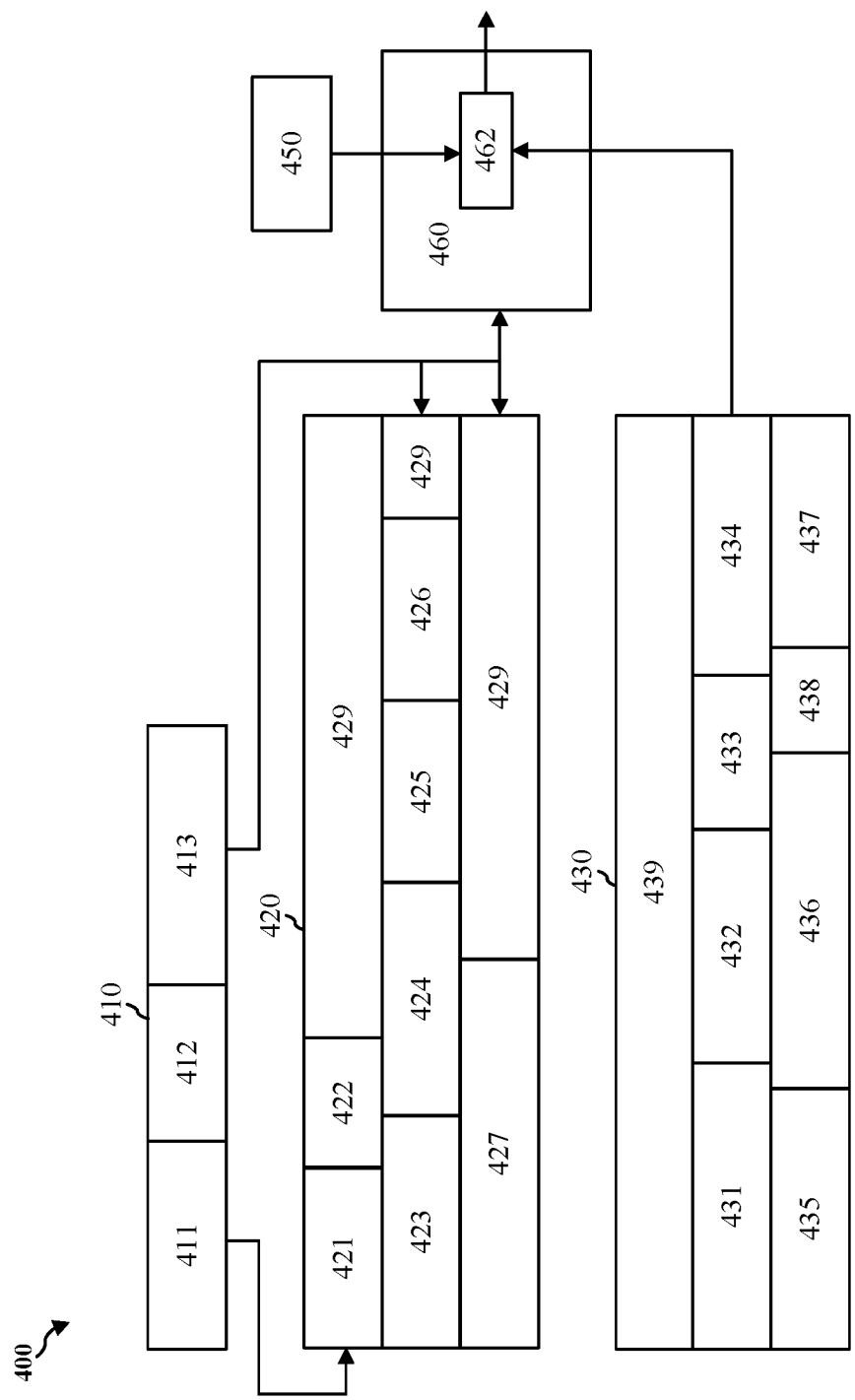
FIG. 4 illustrates an example visibility stream hierarchy in accordance with one or more techniques of this disclosure.

FIG. 4 illustrates an example visibility stream hierarchy 400 in accordance with one or more techniques of this disclosure. Visibility stream hierarchy 400 includes draw call visibility stream 410, primitive visibility stream 420, and tessellated primitive visibility stream 430. As shown in FIG. 4, draw call visibility stream 410 includes coding for multiple draw calls, e.g., first draw call coding 411, second draw call coding 412, and third draw call coding 413. Primitive visibility stream 420 includes first primitive coding 421, second primitive coding 422, third primitive coding 423, fourth primitive coding 424, fifth primitive coding 425, sixth primitive coding 426, seventh primitive coding 427, and null primitive coding 429. Tessellated primitive visibility stream 430 includes first tessellated coding 431, second tessellated coding 432, third tessellated coding 433, fourth tessellated coding 434, fifth tessellated coding 435, sixth tessellated coding 436, null tessellated coding 437, end-of-patch (EOP) coding 438, and per-patch mask 439. FIG. 4 also displays tessellator 450, PC_DP 460, and synchronization block 462.

Draw call visibility stream 410 includes visibility information for multiple draw calls, e.g., draw calls 0-4. By doing so, aspects of the present disclosure can assess the visibility of each draw call, e.g., draw calls 0-4. In some aspects, each draw call coding can be identified by or correspond to an individual code. For example, the code '1001101' can correspond to first draw call coding 411, e.g., for draw call 0, the code '00011' can correspond to second draw call coding 412, e.g., for draw calls 1-3, and the code '10110010' can correspond to third draw call coding 413, e.g., for draw call 4. In some aspects, the coding for each draw call can include a pointer code that identifies each primitive in the draw that is visible.

Primitive visibility stream 420 includes visibility information for multiple primitives, e.g., in order to assess the visibility of each primitive. Similar to the draw call coding, the primitive coding can be identified by or correspond to an individual code. For example, the code '101101' can correspond to first primitive coding 421, e.g., for a first primitive, the code '0010' can correspond to second primitive coding 422, e.g., for a second primitive, the code '10001010' can correspond to third primitive coding 423, e.g., for a third primitive, the code '10010011' can correspond to fourth primitive coding 424, e.g., for a fourth primitive, the code '101001' can correspond to fifth primitive coding 425, e.g., for a fifth primitive, the code '100001' can correspond to sixth primitive coding 426, e.g., for a sixth primitive, the code '10011000011111' can correspond to seventh primitive coding 427, e.g., for a seventh primitive, and code beginning with three or more zeros, e.g., '000', can correspond to null primitive coding 429, e.g., for primitives that are not visible.

In some aspects, primitive visibility stream 420 can help to determine the patches or groups of primitives that are at least partially visible. For instance, aspects of the present disclosure can determine or identify the visible patches, which can be identified as such in the coding, e.g., a coding with a first digit of '1' can correspond to a visible primitive or patch. For example, for a coding of '101101' the first digit of '1' can mean the primitive or patch is visible. A coding of '0110' can correspond to a visibility mask. Also, a coding with a last digit of '1' can correspond to a primitive or patch that is visible in certain bins, e.g., bin 1 and bin 2.

Additionally, tessellated primitive visibility stream 430 includes visibility information for multiple tessellated primitives, e.g., in order to assess the visibility of each tessellated primitive. Similar to the draw call coding and the primitive coding, the tessellated coding can be identified by or correspond to an individual code. For example, the code '1001000110' can correspond to first tessellated coding 431, e.g., for a first tessellated primitive, the code '00001010' can correspond to second tessellated coding 432, e.g., for a second tessellated primitive, and additional codes can correspond to additional tessellated coding 433-436. Also, code beginning with three or more zeros, e.g., '00000000', can correspond to null tessellated coding 437, e.g., for tessellated primitives that are not visible. Accordingly, the sub-primitive visibility information can be encoded in the tessellated primitive visibility stream 430. Also, EOP coding 438 can identify the end of the tessellated primitive coding. Further, the per-patch mask 439 can be optional, such that some tessellated primitive visibility streams include the per-patch mask and some do not.

In some aspects, when GPUs herein are rendering to certain bins, e.g., bins 1 and 2, GPUs can send a patch to the tessellator 450 and the tessellator 450 can output a number of sub-primitives. When these sub-primitives are output, aspects of the present disclosure can decode the tessellated visibility stream and skip or drop the invisible sub-primitives at the synchronization block 462, which can be in PC_DP 460. Thus, visible patches can be sent to the tessellator 450 to generate the tessellation output, where GPUs herein can use the tessellated primitive visibility stream 430 to skip or drop the invisible sub-primitives. As mentioned above, in some aspects, for each individual primitive, if tessellation is enabled, GPUs herein can generate at least one sub-primitive.

Some aspects of the present disclosure can accumulate the sub-primitive information to determine if an original primitive should be dropped or should be synchronized with the tessellator output. Also, the tessellated primitive visibility stream 430 can include new coding or tokens to distinguish from the primitive visibility stream 420. In some aspects, when utilizing tessellated primitive visibility stream 430, aspects of the present disclosure can add a synchronizer or synchronization logic, e.g., synchronization block 462, that is downstream from the tessellator 450. For example, when the tessellator 450 generates a primitive, tessellator 450 can decode the tessellated primitive visibility stream 430 to determine if certain tessellated primitives are visible or not. As mentioned above, tessellated primitives that are not visible can be dropped or skipped during the rendering pass. Additionally, the tessellated primitive visibility stream 430 may encode the visibility information for each tessellated primitive that is visible. Also, tessellated primitive visibility stream 430 can include a compressed result that is independent from the other visibility streams, e.g., for each visible patch.

In some instances, each aspect of the tessellated primitive visibility stream 430 can include a coding format. For example, visible tessellated primitives can include the format: head bit 1, visible mask, and run length encoding (RLE) of a number of compressed primitives. Invisible tessellated primitives can include the format: head bit 0 and RLE of a number of compressed primitives. The EOP can include the format: head bit 1, an all zero mask, and a digit with a value of 1. Further, the end of stream (EOS) can include the format: head bit 1, an all zero mask, and 16 digits with a value of 0. The coding format can provide the definition for a number of the tokens, e.g., what will be encoded in the stream. Further, the EOS can mark the end of the visibility stream, e.g., tessellated primitive visibility stream 430.

Figure 5:
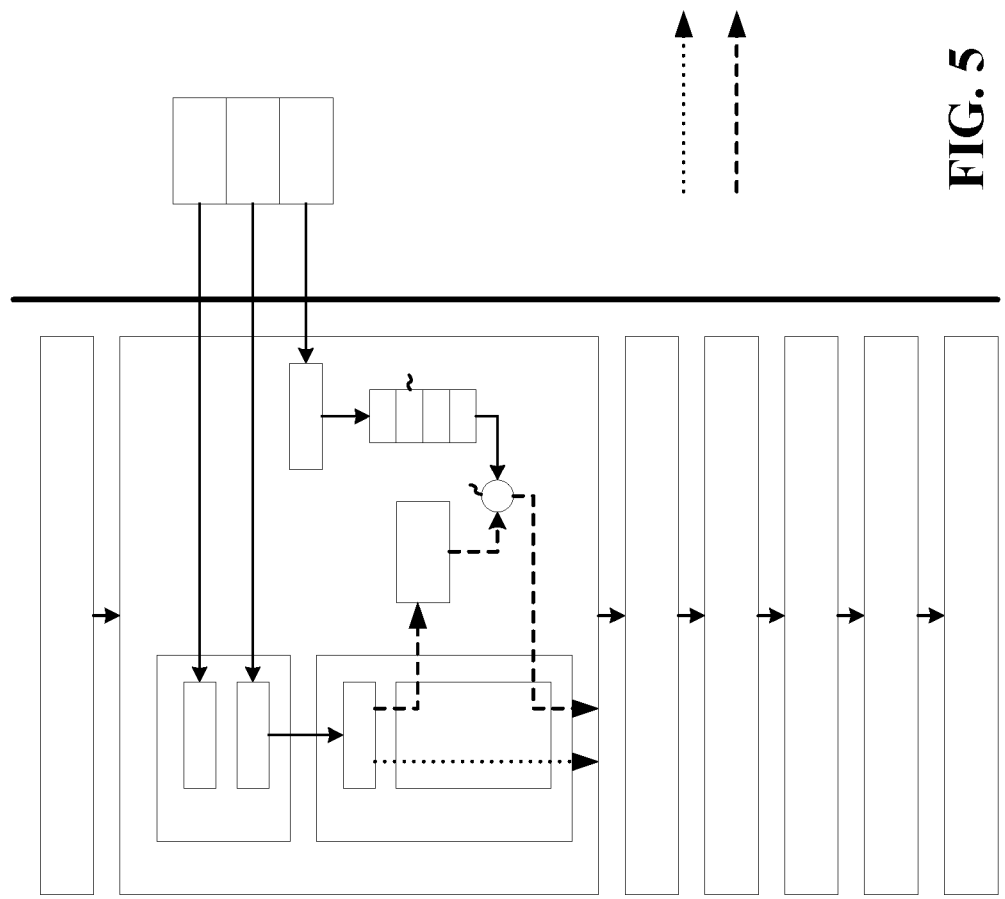
FIG. 5 illustrates an example GPU in accordance with one or more techniques of this disclosure.

FIG. 5 illustrates an example GPU 500 including GPU pipeline 510 and memory 580 in accordance with one or more techniques of this disclosure. GPU pipeline 510 includes command processor (CP) 512, primitive controller (PC) 520, which includes visibility stream decoder (VSD) 530 including draw call VSD (D-VSD) 532 and primitive VSD (P-VSD) 534, vertex cache controller 540 including primitive assembler 542 and primitive amplifier 544. PC 520 can also include TessVSD 536, tessellated primitive span units 552, tessellator 546, and synchronization block 550. GPU pipeline 510 also includes vertex attribute fetcher 560, vertex shader (VS) or domain shader (DS) 562, fixed-function pipeline 564, fragment shader (FS) 566, and per-fragment operation unit 568. Additionally, memory 580 includes draw call visibility stream 582, primitive visibility stream 584, and tessellated primitive visibility stream 586.

FIG. 5 displays one example of the aforementioned process of determining tessellated primitive visibility information, i.e., a tessellated primitive visibility process or check. As shown in FIG. 5, PC 520 can include two independent decoders, e.g., TessVSD 536 and VSD 530 which includes D-VSD 532 and P-VSD 534. In some aspects, VSD 530 can be referred to as primitive controller visibility stream decoder (PCVSD) 530. As shown in FIG. 5, D-VSD 532 and P-VSD 534 can decode the draw call visibility stream 582 and the primitive visibility stream 584, respectively. In some aspects, D-VSD 532 and P-VSD 534 can decode draw calls and patches in the visibility streams 582 and 584, respectively, e.g., in a first decoding pass.

As mentioned above, TessVSD 536 can decode or determine visibility information for sub-primitives. For example, TessVSD 536 can decode and generate a visible tessellated primitive span for visible patches or sub-primitives. In some aspects, TessVSD 536 can decode and identify patches or sub-primitives that are not visible. For instance, TessVSD 536 can help to skip or drop invisible patches or sub-primitives based on a per-bin visible mask for each patch or sub-primitive. As shown in FIG. 5, TessVSD 536 can be independent from the VSD 532 and P-VSD 534. TessVSD 536 can process information in the tessellated primitive visibility stream 586 and run or process based on a trigger in the tessellated primitive visibility stream 586. TessVSD 536 can also store output into a FIFO queue, e.g., to wait for the tessellator 546 to output the sub-primitives, and perform the a synchronization process at the synchronization block 550. The synchronization block 550 can synchronize the tessellated primitive span from the TessVSD 536 with the output from tessellator 546. After this, visible tessellated primitives can be sent downstream to other units in the GPU pipeline 510, e.g., vertex attribute fetcher 560, VS or DS 562, fixed-function pipeline 564, FS 566, and/or per-fragment operation unit 568.

FIG. 5 also illustrates a data path of the VS 562, e.g., data path 592, and a data path of the DS 562, e.g., data path 594. In some aspects, data path 592 can be a first decoding pass and data path 594 can be a second decoding pass. As shown in FIG. 5, data path 592 can bypass the tessellator 546. Additionally, data path 592 can include information corresponding to the coordinates and tessellation factors for patches or sub-primitives. In some aspects, data path 594 can include information corresponding to the tessellation process, as well as the generation of sub-primitives. Accordingly, the data path 594 can process information through the tessellator 546 and include information corresponding to encoding or decoding the tessellated primitive visibility stream 586, e.g., with TessVSD 536. Data path 594 can also include information corresponding to the rendering or generation of visible sub-primitives. In some aspects, a first decoding pass with data path 592 can occur prior to a second decoding pass with data path 594.

Figure 6:
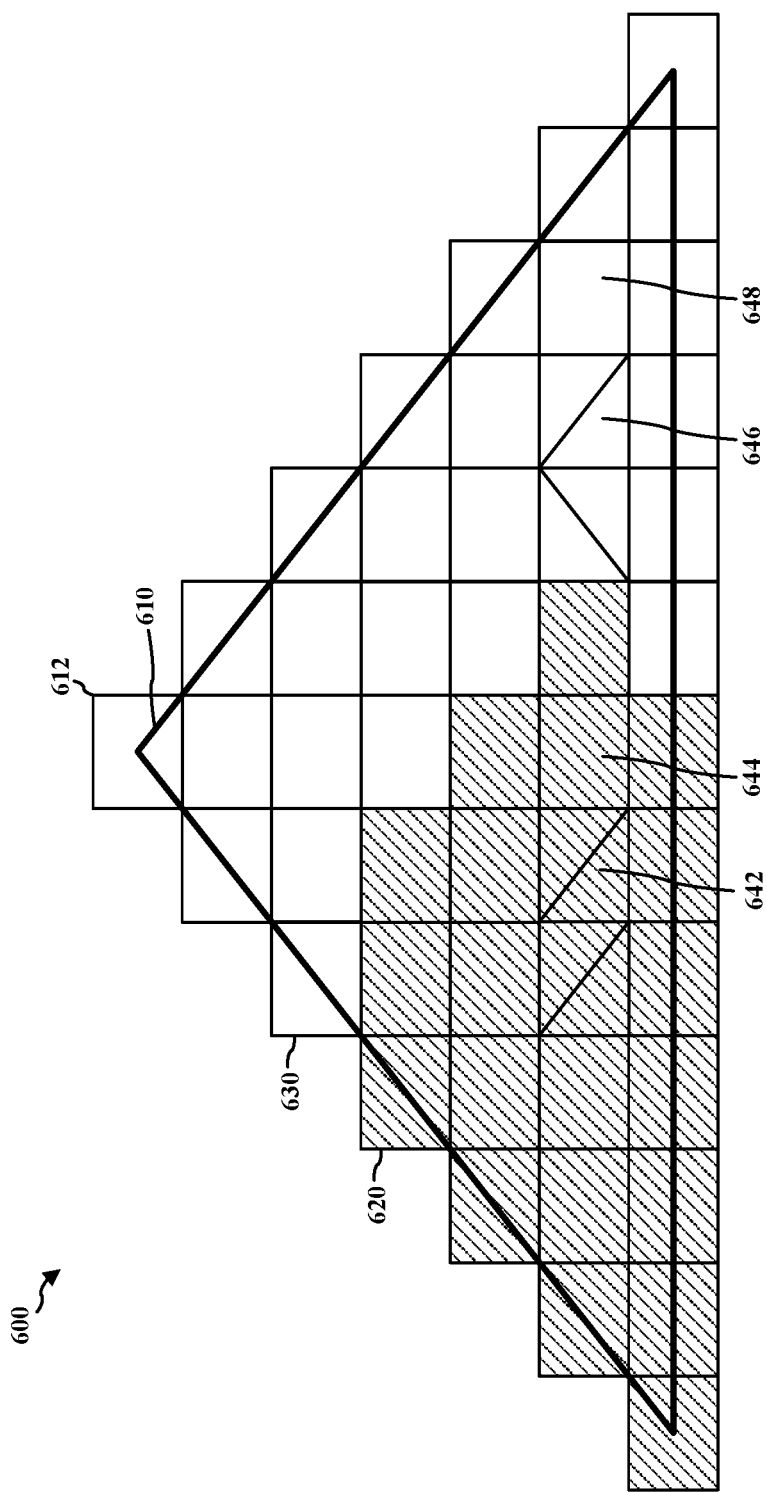
FIG. 6 illustrates an example image or surface in accordance with one or more techniques of this disclosure.

FIG. 6 illustrates image or surface 600 including patch or primitives 610 and sub-primitives 612 in accordance with one or more techniques of this disclosure. FIG. 6 also displays that each of the sub-primitives 612 include visibility information, e.g., visibility information 620 or visibility information 630. Additionally, FIG. 6 shows that the visibility information 620, 630 can be used to identify each of the sub-primitives 612 as visible or not visible. For example, visibility information 620 can correspond to visible sub-primitives, e.g., visible sub-primitives 642, 644, and visibility information 630 can correspond to sub-primitives that are not visible, e.g., invisible sub-primitives 646, 648. The visible sub-primitives can be identified or marked, e.g., with diagonal lines as shown in FIG. 6. The sub-primitives that are not visible, i.e., invisible sub-primitives, can also be identified or marked, e.g., the sub-primitives can be clear as shown in FIG. 6. Sub-primitives 612 can also include a number of different shapes, such as triangles, e.g., visible sub-primitive 642 and invisible sub-primitive 646, or rectangles, e.g., visible sub-primitive 644 and invisible sub-primitive 648.

FIG. 6 illustrates one example of the aforementioned process for determining or generating a sub-primitive visibility stream or tessellated primitive visibility stream. As shown in FIG. 6, aspects of the present disclosure, e.g., GPUs herein, can perform a number of different steps or processes to determine or generate a sub-primitive visibility stream. For instance, aspects of the present disclosure can determine a plurality of sub-primitives, e.g., sub-primitives 612, corresponding to one or more primitives, e.g., patch or primitives 610, in an image, e.g., image or surface 600. To determine the plurality of sub-primitives 612, GPUs herein can generate the plurality of sub-primitives 612 in a tessellator. In some aspects, the plurality of sub-primitives 612 can be generated in the tessellator during a tessellation process, where each of the plurality of sub-primitives 612 can be a tessellated primitive 612. Aspects of the present disclosure can also determine visibility information, e.g., visibility information 620, 630, for each of the plurality of sub-primitives 612. The visibility information 620, 630 can include information regarding whether the sub-primitive 612 is visible.

Additionally, aspects of the present disclosure can identify one or more of the sub-primitives 612 as visible, e.g., visible sub-primitives 642, 644, based on the determined visibility information, e.g., visibility information 620. GPUs herein can also identify at least one of the plurality of sub-primitives as not visible, e.g., invisible sub-primitives 646, 648, based on the determined visibility information, e.g., visibility information 630. GPUs herein can also determine a sub-primitive visibility stream including the one or more of the sub-primitives 612 identified as visible, e.g., visible sub-primitives 642, 644. To determine the sub-primitive visibility stream, GPUs herein can generate the sub-primitive visibility stream including the one or more of the sub-primitives 612 identified as visible, e.g., visible sub-primitives 642, 644. In some aspects, the sub-primitive visibility stream can be determined in a graphics processing pipeline of a GPU.

Aspects of the present disclosure can also render at least one of the one or more sub-primitives 612 identified as visible, e.g., visible sub-primitives 642, 644, in the sub-primitive visibility stream. GPUs herein can also determine to skip rendering the at least one of the sub-primitives 612 identified as not visible, e.g., invisible sub-primitives 646, 648. Aspects of the present disclosure can also generate graphical content based on the sub-primitive visibility stream.

In some aspects, the one or more primitives, e.g., patch or primitives 610, can be at least partially visible. Moreover, GPUs herein can determine primitive visibility information for the one or more primitives, e.g., patch or primitives 610. The primitive visibility information can include information regarding whether the one or more primitives, e.g., patch or primitives 610, are at least partially visible. Aspects of the present disclosure can also identify the one or more primitives, e.g., patch or primitives 610, as visible. GPUs herein can also generate a primitive visibility stream including the one or more primitives, e.g., patch or primitives 610. In some aspects, the one or more primitives, e.g., patch or primitives 610, can be divided into the plurality of sub-primitives, e.g., sub-primitives 612, such that each of the plurality of sub-primitives are smaller than each of the one or more primitives. Aspects of the present disclosure can also determine draw call visibility information for one or more draw calls, where the draw call visibility information can include information regarding whether the one or more draw calls are at least partially visible. Further, GPUs herein can identify the one or more draw calls as visible. Additionally, aspects of the present disclosure can generate a draw call visibility stream including the one or more draw calls.

Aspects of the present disclosure can also include a software interface and corresponding programming. For instance, a section of memory can be allocated for the tessellated primitive visibility stream. In some aspects, the software interface can determine the memory address of visibility streams located in the memory. The GPU hardware can use this information to calculate the address of each visibility stream and fetch the corresponding data. For example, once the software interface determines the memory address, the GPU hardware can calculate the address of the tessellated primitive visibility stream, in addition to the addresses of the draw call visibility stream and the primitive visibility stream.

The software interface can also program a number of registers with a variety of functions. For instance, the software can program a VSC_PIPE_DATA_BASE register to a value of zero in order to disable generating the tessellated primitive visibility stream. Also, the software can program a PC_TVIS_STREAM_BIN_SIZE register to a value of zero in order to disable using the tessellated primitive visibility stream. A number of different registers can correspond to different values or functions. For example, a VSC_PIPE_DATA_TESS_BASE_LO|HI register can correspond to the address of the tessellated primitive visibility stream. A VSC_PIPE_DATA_TESS_STRIDE register can correspond to the stride of the tessellated primitive visibility stream. Also, a VSC_PIPE_DATA_TESS_LENGTH register can correspond to the length of the tessellated primitive visibility stream. A VSC_TESS_SIZE_BASE_LO|HI register can correspond to the memory address for writing the size of the resulting tessellated primitive visibility stream. Additionally, a PC_TVIS_STREAM_BIN_BASE_LO|HI register can correspond to the base address of tessellated primitive visibility stream. Further, a PC_TVIS_STREAM_BIN_SIZE register can correspond to the size of tessellated primitive visibility stream.

As mentioned above, aspects of the present disclosure can include a number of benefits or advantages. For instance, aspects of the present disclosure can reduce the rendering workload by GPUs. For example, aspects of the present disclosure can reduce the workload for processing and rendering tessellated primitives, as well as reduce the DS workload and execution time. In some aspects, GPUs herein can experience a significant reduction in primitives rendered, as the present disclosure can help to identify invisible primitives that do not need rendering. For example, GPUs herein can experience a 64% reduction in primitives rendered, as well as a 49% reduction in the DS workload.

Figure 7:
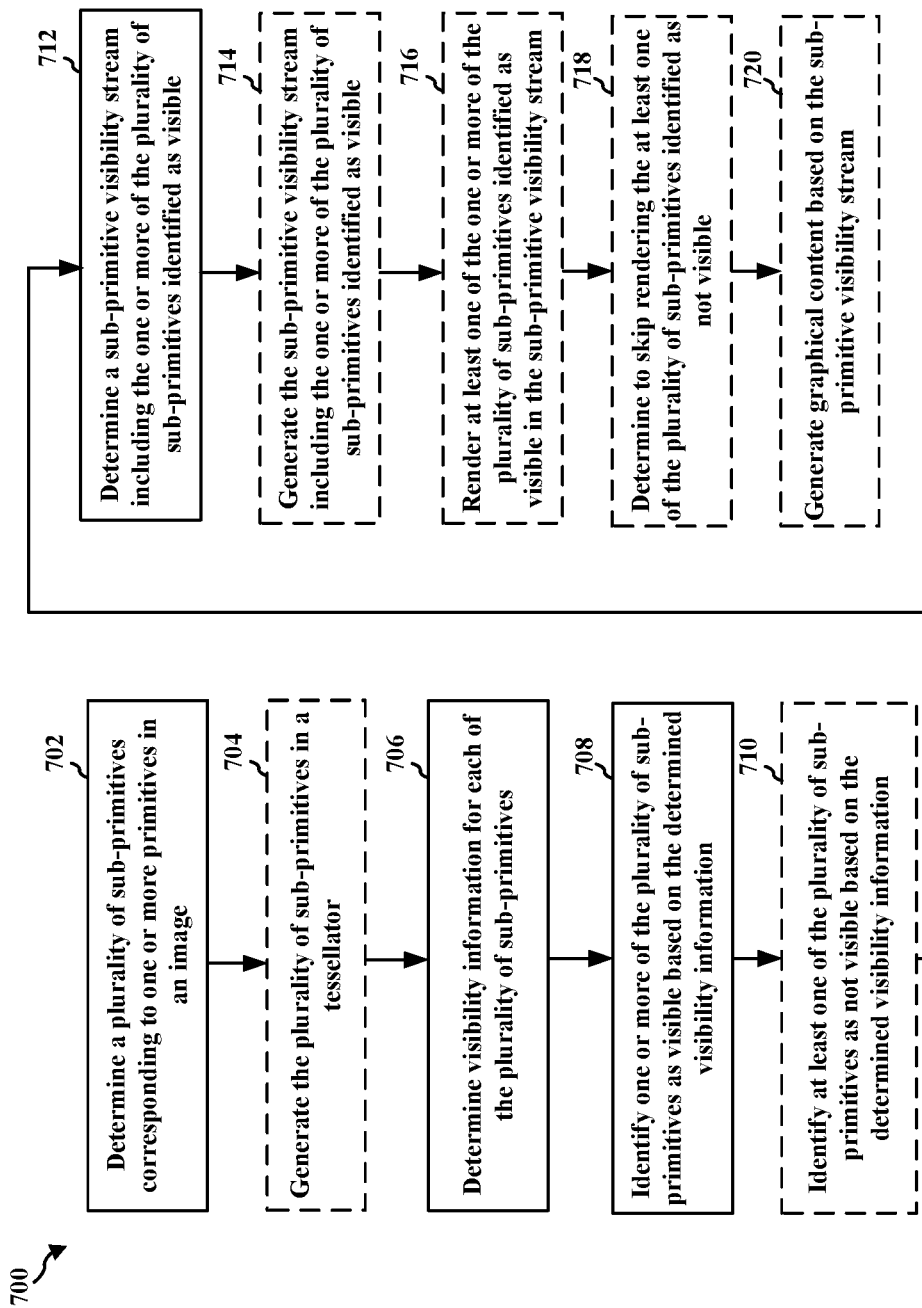
FIG. 7 illustrates an example flowchart of an example method in accordance with one or more techniques of this disclosure.

FIG. 7 illustrates an example flowchart 700 of an example method in accordance with one or more techniques of this disclosure. The method may be performed by a GPU or apparatus for graphics processing. At 702, the apparatus can determine a plurality of sub-primitives corresponding to one or more primitives in an image, as described in connection with the examples in FIGS. 3, 4, 5, and 6. At 704, when determining the plurality of sub-primitives the apparatus can be configured to generate the plurality of sub-primitives in a tessellator, as described in connection with the examples in FIGS. 3, 4, 5, and 6. In some aspects, the plurality of sub-primitives are generated in the tessellator during a tessellation process, where each of the plurality of sub-primitives can be a tessellated primitive, as described in connection with the examples in FIGS. 3, 4, 5, and 6. At 706, the apparatus can determine visibility information for each of the plurality of sub-primitives, where the visibility information can include information regarding whether the sub-primitive is visible, as described in connection with the examples in FIGS. 3, 4, 5, and 6.

At 708, the apparatus can identify one or more of the plurality of sub-primitives as visible based on the determined visibility information, as described in connection with the examples in FIGS. 3, 4, 5, and 6. At 710, the apparatus can also identify at least one of the plurality of sub-primitives as not visible based on the determined visibility information, as described in connection with the examples in FIGS. 3, 4, 5, and 6. At 712, the apparatus can also determine a sub-primitive visibility stream including the one or more of the plurality of sub-primitives identified as visible, as described in connection with the examples in FIGS. 3, 4, 5, and 6. At 714, when determining the sub-primitive visibility stream the apparatus can be configured to generate the sub-primitive visibility stream including the one or more of the plurality of sub-primitives identified as visible, as described in connection with the examples in FIGS. 3, 4, 5, and 6. In some aspects, the sub-primitive visibility stream can be determined in a graphics processing pipeline of a GPU, as described in connection with the examples in FIGS. 3, 4, 5, and 6.

At 716, the apparatus can render at least one of the one or more of the plurality of sub-primitives identified as visible in the sub-primitive visibility stream, as described in connection with the examples in FIGS. 3, 4, 5, and 6. At 718, the apparatus can determine to skip rendering the at least one of the plurality of sub-primitives identified as not visible, as described in connection with the examples in FIGS. 3, 4, 5, and 6. At 720, the apparatus can also generate graphical content based on the sub-primitive visibility stream, as described in connection with the above examples in FIGS. 3, 4, 5, and 6.

In some aspects, the one or more primitives can be at least partially visible, as described in connection with the examples in FIGS. 3, 4, 5, and 6. Also, the apparatus can determine primitive visibility information for the one or more primitives, where the primitive visibility information can include information regarding whether the one or more primitives are at least partially visible, as described in connection with the examples in FIGS. 3, 4, 5, and 6. The apparatus can also identify the one or more primitives as visible, as described in connection with the examples in FIGS. 3, 4, 5, and 6. The apparatus can also generate a primitive visibility stream including the one or more primitives, as described in connection with the examples in FIGS. 3, 4, 5, and 6. In some aspects, the one or more primitives can be divided into the plurality of sub-primitives such that each of the plurality of sub-primitives are smaller than each of the one or more primitives, as described in connection with the examples in FIGS. 3, 4, 5, and 6.

In some aspects, the apparatus can also determine draw call visibility information for one or more draw calls, where the draw call visibility information can include information regarding whether the one or more draw calls are at least partially visible, as described in connection with the examples in FIGS. 3, 4, 5, and 6. The apparatus can also identify the one or more draw calls as visible, as described in connection with the examples in FIGS. 3, 4, 5, and 6. Further, the apparatus can generate a draw call visibility stream including the one or more draw calls, as described in connection with the examples in FIGS. 3, 4, 5, and 6.

In one configuration, a method or apparatus for graphics processing is provided. The apparatus may be a GPU or some other processor that can perform graphics processing. In one aspect, the apparatus may be the processing unit 120 within the device 104, or may be some other hardware within device 104 or another device. The apparatus may include means for determining a plurality of sub-primitives corresponding to one or more primitives in an image. The apparatus may also include means for determining visibility information for each of the plurality of sub-primitives, where the visibility information includes information regarding whether the sub-primitive is visible. The apparatus may also include means for identifying one or more of the plurality of sub-primitives as visible based on the determined visibility information. Additionally, the apparatus may include means for determining a sub-primitive visibility stream including the one or more of the plurality of sub-primitives identified as visible. The apparatus may also include means for rendering at least one of the one or more of the plurality of sub-primitives identified as visible in the sub-primitive visibility stream. The apparatus may also include means for identifying at least one of the plurality of sub-primitives as not visible based on the determined visibility information. Further, the apparatus may include means for determining to skip rendering the at least one of the plurality of sub-primitives identified as not visible. Also, the means for determining the plurality of sub-primitives may be further configured to generate the plurality of sub-primitives in a tessellator. Moreover, the means for determining the sub-primitive visibility stream including the one or more of the plurality of sub-primitives identified as visible may be further configured to generate the sub-primitive visibility stream including the one or more of the plurality of sub-primitives identified as visible. The apparatus may also include means for generating graphical content based on the sub-primitive visibility stream. Additionally, the apparatus may include means for determining primitive visibility information for the one or more primitives, where the primitive visibility information includes information regarding whether the one or more primitives are at least partially visible. The apparatus may also include means for identifying the one or more primitives as visible. The apparatus may also include means for generating a primitive visibility stream including the one or more primitives. Further, the apparatus may include means for determining draw call visibility information for one or more draw calls, where the draw call visibility information includes information regarding whether the one or more draw calls are at least partially visible. The apparatus may also include means for identifying the one or more draw calls as visible. The apparatus may also include means for generating a draw call visibility stream including the one or more draw calls.

The subject matter described herein can be implemented to realize one or more benefits or advantages. For instance, the described graphics processing techniques can be accomplished at a low cost compared to other graphics processing techniques. Moreover, the graphics processing techniques herein can improve or speed up the data processing or execution of GPUs. Further, the graphics processing techniques herein can improve a GPU's resource or data utilization and/or resource efficiency. Additionally, aspects of the present disclosure can mitigate or reduce the workload in a GPU, e.g., when determining or rendering primitives or sub-primitives.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method for graphics processing, comprising:
   receiving, at a tessellator, one or more primitives in an image;
   determining draw call visibility information for one or more draw calls, wherein the draw call visibility information includes information regarding whether the one or more draw calls are at least partially visible;
   identifying the one or more draw calls as visible;
   generating a draw call visibility stream as part of a visibility stream hierarchy that includes the one or more draw calls;
   generating, at the tessellator, a plurality of sub-primitives including at least one visible sub-primitive and one non-visible sub-primitive associated with the one or more primitives, the plurality of sub-primitives corresponding to a plurality of tessellated primitives;
   determining visibility information for each of the plurality of sub-primitives, wherein the visibility information includes information regarding whether the sub-primitive is visible;
   identifying one or more of the plurality of sub-primitives as visible based on the determined visibility information;
   determining a sub-primitive visibility stream as part of the visibility stream hierarchy including the one or more of the plurality of sub-primitives identified as visible, wherein the sub-primitive visibility stream is a level below the draw call visibility stream;
   rendering at least one of the one or more of the plurality of sub-primitives identified as visible in the sub-primitive visibility stream;
   identifying at least one of the plurality of sub-primitives as not visible based on the determined visibility information; and
   marking the at least one of the plurality of sub-primitives identified as not visible.

2. The method of claim 1, further comprising:
   determining to skip rendering the at least one of the plurality of sub-primitives identified as not visible.

3. The method of claim 1, wherein the plurality of sub-primitives are generated in the tessellator during a tessellation process, wherein each of the plurality of sub-primitives is a tessellated primitive.

4. The method of claim 1, wherein determining the sub-primitive visibility stream including the one or more of the plurality of sub-primitives identified as visible further comprises:
   generating the sub-primitive visibility stream including the one or more of the plurality of sub-primitives identified as visible.

5. The method of claim 1, further comprising:
   generating graphical content based on the sub-primitive visibility stream.

6. The method of claim 1, wherein the one or more primitives are at least partially visible.

7. The method of claim 1, further comprising:
   determining primitive visibility information for the one or more primitives, wherein the primitive visibility information includes information regarding whether the one or more primitives are at least partially visible;
   identifying the one or more primitives as visible; and
   generating a primitive visibility stream including the one or more primitives.

8. The method of claim 1, wherein the one or more primitives are divided into the plurality of sub-primitives such that each of the plurality of sub-primitives are smaller than each of the one or more primitives.

9. The method of claim 1, wherein the sub-primitive visibility stream is determined in a graphics processing pipeline of a graphics processing unit (GPU).

10. An apparatus for graphics processing, comprising:
    a memory; and
    at least one processor coupled to the memory and configured to:
      receive, at a tessellator, one or more primitives in an image;
      determine draw call visibility information for one or more draw calls, wherein the draw call visibility information includes information regarding whether the one or more draw calls are at least partially visible;

identify the one or more draw calls as visible;
generate a draw call visibility stream as part of a visibility stream hierarchy that includes the one or more draw calls;
generate, at the tessellator, a plurality of sub-primitives including at least one visible sub-primitive and one non-visible sub-primitive associated with the one or more primitives, the plurality of sub-primitives corresponding to a plurality of tessellated primitives;
determine visibility information for each of the plurality of sub-primitives, wherein the visibility information includes information regarding whether the sub-primitive is visible;
identify one or more of the plurality of sub-primitives as visible based on the determined visibility information;
determine a sub-primitive visibility stream as part of the visibility stream hierarchy including the one or more of the plurality of sub-primitives identified as visible, wherein the sub-primitive visibility stream is a level below the draw call visibility stream;
render at least one of the one or more of the plurality of sub-primitives identified as visible in the sub-primitive visibility stream;
identify at least one of the plurality of sub-primitives as not visible based on the determined visibility information; and
mark the at least one of the plurality of sub-primitives identified as not visible.

11. The apparatus of claim 10, wherein the at least one processor is further configured to:
determine to skip rendering the at least one of the plurality of sub-primitives identified as not visible.

12. The apparatus of claim 10, wherein the plurality of sub-primitives are generated in the tessellator during a tessellation process, wherein each of the plurality of sub-primitives is a tessellated primitive.

13. The apparatus of claim 10, wherein to determine the sub-primitive visibility stream including the one or more of the plurality of sub-primitives identified as visible includes the at least one processor further configured to:
generate the sub-primitive visibility stream including the one or more of the plurality of sub-primitives identified as visible.

14. The apparatus of claim 10, wherein the at least one processor is further configured to:
generate graphical content based on the sub-primitive visibility stream.

15. The apparatus of claim 10, wherein the one or more primitives are at least partially visible.

16. The apparatus of claim 10, wherein the at least one processor is further configured to:
determine primitive visibility information for the one or more primitives, wherein the primitive visibility information includes information regarding whether the one or more primitives are at least partially visible;
identify the one or more primitives as visible; and
generate a primitive visibility stream including the one or more primitives.

17. The apparatus of claim 10, wherein the one or more primitives are divided into the plurality of sub-primitives such that each of the plurality of sub-primitives are smaller than each of the one or more primitives.

18. The apparatus of claim 10, wherein the sub-primitive visibility stream is determined in a graphics processing pipeline of a graphics processing unit (GPU).

19. An apparatus for graphics processing, comprising:
means for receiving, at a tessellator, one or more primitives in an image;
means for determining draw call visibility information for one or more draw calls, wherein the draw call visibility information includes information regarding whether the one or more draw calls are at least partially visible;
means for identifying the one or more draw calls as visible;
means for generating a draw call visibility stream as part of a visibility stream hierarchy that includes the one or more draw calls;
means for generating, at the tessellator, a plurality of sub-primitives including at least one visible sub-primitive and one non-visible sub-primitive associated with the one or more primitives, the plurality of sub-primitives corresponding to a plurality of tessellated primitives;
means for determining visibility information for each of the plurality of sub-primitives, wherein the visibility information includes information regarding whether the sub-primitive is visible;
means for identifying one or more of the plurality of sub-primitives as visible based on the determined visibility information;
means for determining a sub-primitive visibility stream as part of the visibility stream hierarchy including the one or more of the plurality of sub-primitives identified as visible, wherein the sub-primitive visibility stream is a level below the draw call visibility stream;
rendering at least one of the one or more of the plurality of sub-primitives identified as visible in the sub-primitive visibility stream;
identifying at least one of the plurality of sub-primitives as not visible based on the determined visibility information; and
marking the at least one of the plurality of sub-primitives identified as not visible.

20. The apparatus of claim 19, further comprising:
means for determining to skip rendering the at least one of the plurality of sub-primitives identified as not visible.

21. The apparatus of claim 19, wherein the means for determining the plurality of sub-primitives is further configured to:
wherein the plurality of sub-primitives are generated in the tessellator during a tessellation process, wherein each of the plurality of sub-primitives is a tessellated primitive.

22. The apparatus of claim 19, further comprising:
means for determining primitive visibility information for the one or more primitives, wherein the primitive visibility information includes information regarding whether the one or more primitives are at least partially visible;
means for identifying the one or more primitives as visible; and
means for generating a primitive visibility stream including the one or more primitives.

23. A non-transitory computer-readable medium storing computer executable code for graphics processing, comprising code to:
receive, at a tessellator, one or more primitives in an image;
determine draw call visibility information for one or more draw calls, wherein the draw call visibility information includes information regarding whether the one or more draw calls are at least partially visible;

identify the one or more draw calls as visible;
generate a draw call visibility stream as part of a visibility stream hierarchy that includes the one or more draw calls;
generate, at the tessellator, a plurality of sub-primitives including at least one visible sub-primitive and one non-visible sub-primitive associated with the one or more primitives, the plurality of sub-primitives corresponding to a plurality of tessellated primitives;
determine visibility information for each of the plurality of sub-primitives, wherein the visibility information includes information regarding whether the sub-primitive is visible;
identify one or more of the plurality of sub-primitives as visible based on the determined visibility information;
determine a sub-primitive visibility stream as part of the visibility stream hierarchy including the one or more of the plurality of sub-primitives identified as visible, wherein the sub-primitive visibility stream is a level below the draw call visibility stream;
render at least one of the one or more of the plurality of sub-primitives identified as visible in the sub-primitive visibility stream;
identify at least one of the plurality of sub-primitives as not visible based on the determined visibility information; and
mark the at least one of the plurality of sub-primitives identified as not visible.

* * * * *